United States Patent [19]

Traylor

[11] 4,250,920
[45] Feb. 17, 1981

[54] VALVE FOR WATER TREATMENT EQUIPMENT

[76] Inventor: Paul L. Traylor, 16591 Milliken Ave., Irvine, Calif. 92714

[21] Appl. No.: 958,347

[22] Filed: Nov. 6, 1978

[51] Int. Cl.³ ............................................. F16K 11/02
[52] U.S. Cl. ............................. 137/625.29; 137/625.5; 137/269
[58] Field of Search ................. 137/625.29, 625.5, 269

[56] References Cited

U.S. PATENT DOCUMENTS

| | | | |
|---|---|---|---|
| 645,696 | 3/1900 | Topp | 137/625.5 X |
| 2,553,458 | 5/1951 | Jordan | 137/625.29 |
| 2,703,106 | 3/1955 | Borgerd et al. | 137/625.5 X |
| 3,643,692 | 2/1972 | Traylor | 137/625.29 X |
| 4,111,230 | 9/1978 | Stampfli | 137/625.5 |

*Primary Examiner*—Arnold Rosenthal
*Attorney, Agent, or Firm*—Fulwider, Patton, Rieber, Lee & Utecht

[57] ABSTRACT

A valve for water treatment equipment and characterized by an elongated chamber divided into sections interconnected by passages surrounded by longitudinally aligned valve seats. A valve stem supporting a pair of valve heads is longitudinally movable toward a service position, in which the valve heads cooperate with the valve seats to direct water from a supply port to an inlet port to the water treatment equipment, and from the outlet port of such equipment to a distribution port. The valve stem is also movable to a by-pass position in which the valve heads co-operate with the valve seats to by-pass water from the supply port around the water treatment equipment. The valve stem is threadably advanced so that the rate of water flow can be closely adjusted. The valve is readily adapted for use in backwashing, one embodiment utilizing a bonnet threadably mounted in the valve and rotatable to convert the valve by-pass position to a backwash position.

5 Claims, 7 Drawing Figures

U.S. Patent  Feb. 17, 1981  Sheet 1 of 2  4,250,920
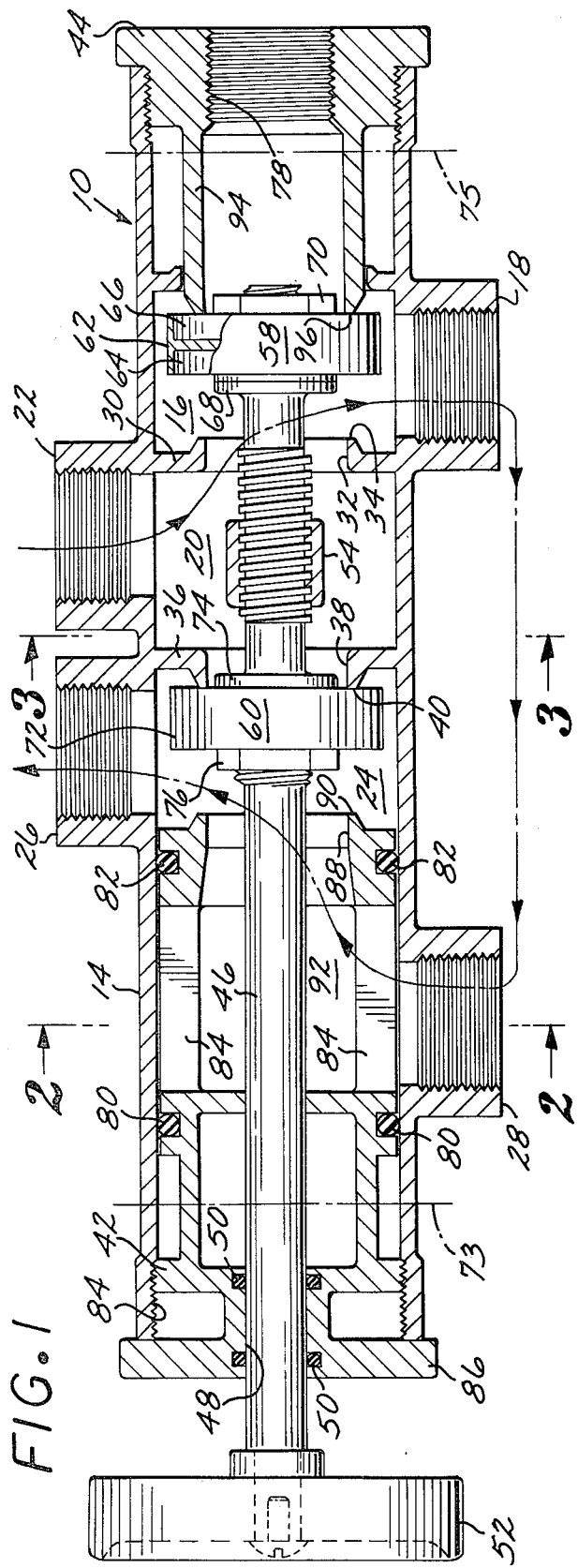
FIG. 1
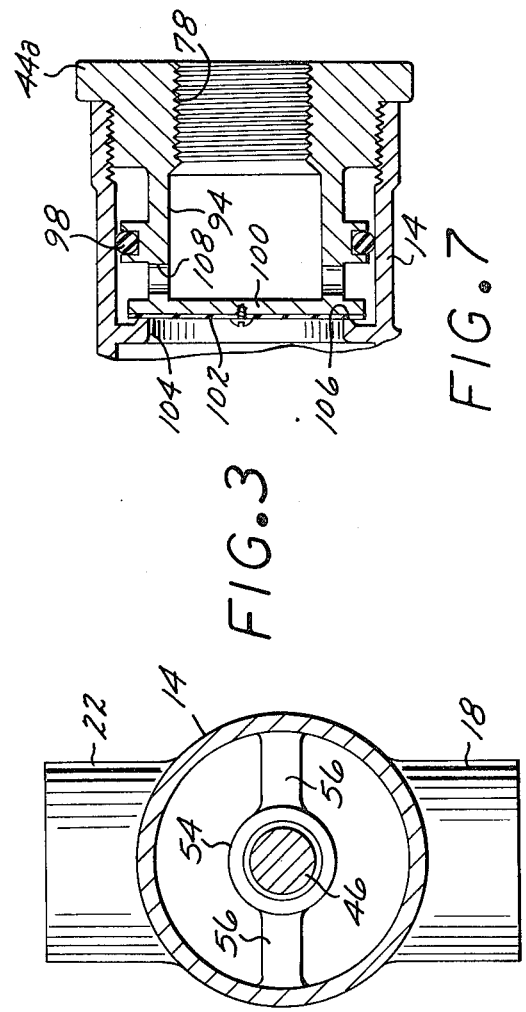
FIG. 3
FIG. 2
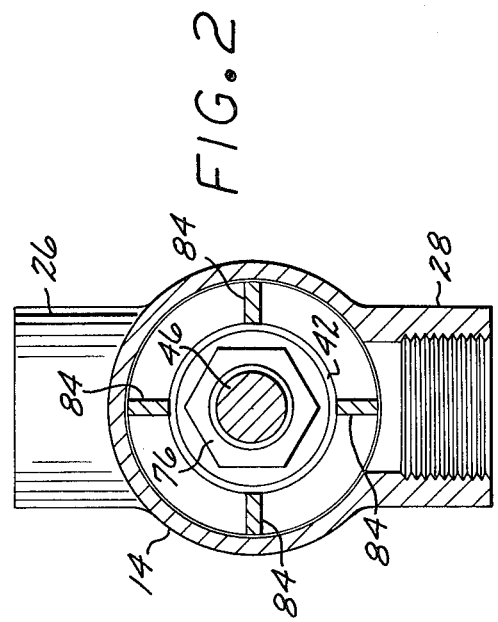
FIG. 7

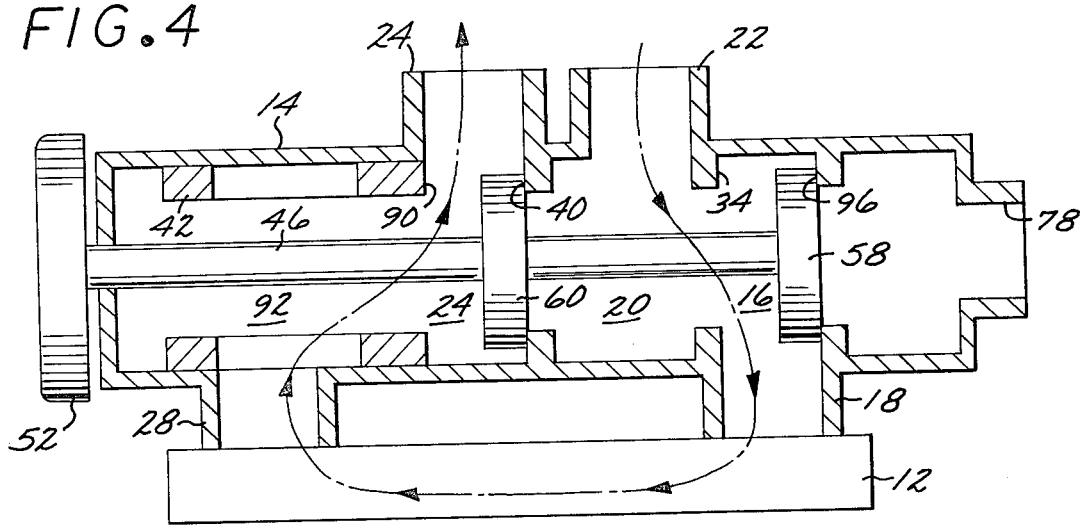
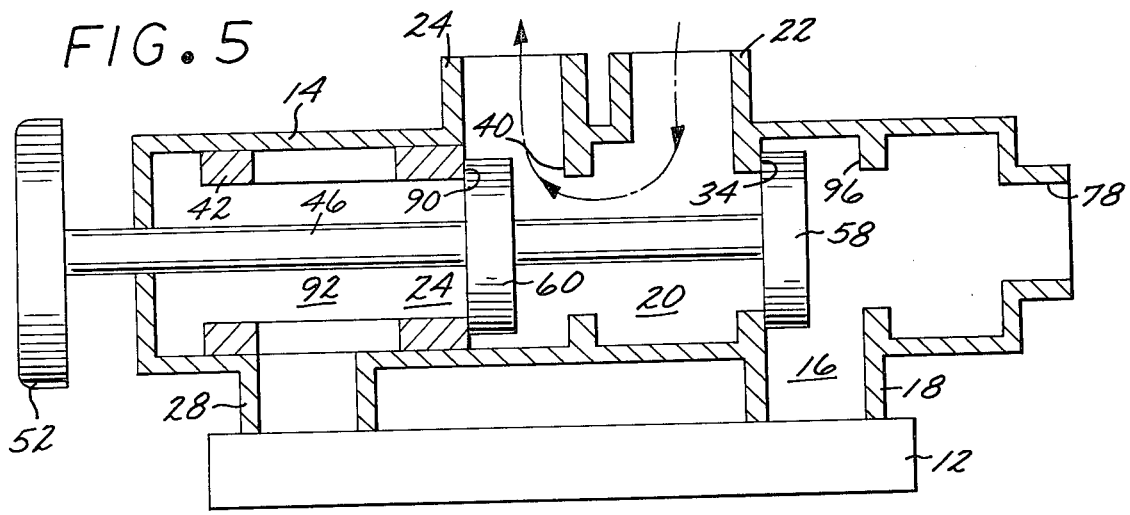
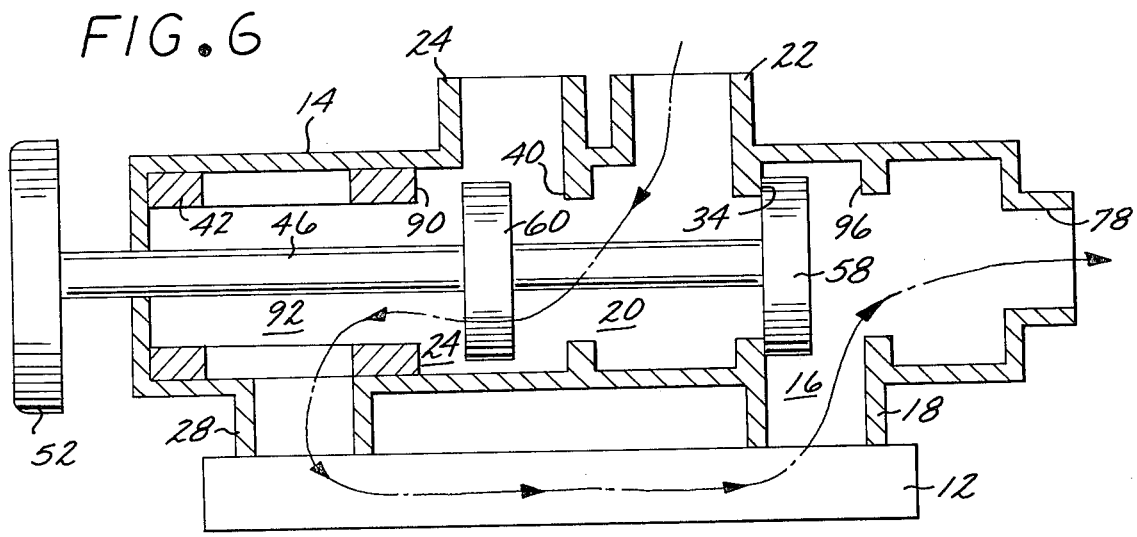

VALVE FOR WATER TREATMENT EQUIPMENT

BACKGROUND OF THE INVENTION

1. Field of the Invention

The present invention relates to a valve for controlling fluid flow, and particularly to a valve which is readily converted to function as a by-pass valve or a backwash valve.

2. Description of the Prior Art

The present invention has particular application to the control of a water softener having a tank containing material through which hard water is passed for softening. It is often desirable to by-pass or redirect the water flow so that it does not pass through the tank, such as when the water softener equipment is to be repaired or when the user plans to be away for an extended period of time and wishes to shut down the softener. A so-called by-pass valve is used to do this. Such a valve is also commonly used in non-automatic types of water softeners, in which the tank is periodically replaced with one having a fresh charge of softener material.

My U.S. Pat. No. 3,643,692, entitled "Valve," and issued Feb. 22, 1972, discloses a typical by-pass valve operative to perform the functions just described. Although the valve generally operates satisfactorily, there are a number of areas in which improvements are desirable. For example, it has been found that the use of O-rings for sealing purposes is not completely satisfactory in that the O-rings tend to abrade during travel across valve ports. Also, in some instances unusually high pressures have rolled or pinched the O-rings such that undesirable leakage occurs. Further, the passage within which the O-rings travel sometimes becomes scaled or corroded over a period of time, and it is difficult to slide the O-rings over this material. Also, the material of the O-rings tends to bond or migrate into the pores of the brass material of which such a valve is usually made, which tends to prevent slidable movement of the O-rings.

Another problem with the O-ring type of valve disclosed in the patent is that the water flow is usually full on or full off because the valve stem is a push-pull type. It is often desirable to provide a slower flow of water on initial filling of a softener tank.

The by-pass valves of the aforementioned patent, as well as most by-pass valves of the prior art, are able to perform only a by-pass function and there are situations where this is unduly limiting. For example, where a by-pass valve is to be used in conjunction with water treatment equipment in the form of a sand filter or the like for filtering impurities out of the water, it is desirable not only to be able to bypass the equipment during its repair or replacement, but also periodically to reverse the flow of water to backwash the filter. At present the usual by-pass valve is supplemented with a second valve to perform the backwashing operation. It is preferable to have a single valve adapted for easy conversion from a by-pass operation to a backwash operation.

SUMMARY OF THE INVENTION

According to the present invention, a valve is provided which is adapted for use with various kinds of water treatment equipment, and which is characterized by a long service life, ease of manufacture, and simplicity of operation. It is particularly adapted, although not limited, to use with water softeners. It is characterized by a casing having an elongated chamber divided into sections having various ports, including a supply port for accepting water from a water supply, a distribution port for distributing treated water, a treatment inlet port adapted for connection to the water treatment equipment, and a treatment outlet port for carrying treated water into the valve for passage to the distribution port. The chamber sections are interconnected by passages surrounded by longitudinally aligned valve seats which are opened and closed by valve heads movable with a longitudinally movable valve stem.

The valve stem is threadably supported by the casing so that its movement can be precisely adjusted through rotation of the valve stem, thereby closely controlling the rate of water flow through the valve. The valve heads seat positively upon the valve seats, rather than rolling or sliding into position, which eliminates the premature wear and failure associated with O-rings.

The valve stem is characterized by a service position in which water is directed from the supply port to the treatment inlet port, and from the treatment outlet port to the distribution port. In the by-pass position of the valve stem, water passes from the supply port to the distribution port, by-passing the water treatment equipment. The casing is constructed such that it can be provided with a drain port, and the location of the valve heads can then be operative to direct water from the supply port to the treatment outlet port. This reverse flow of water through the water treatment equipment backwashes it, and the effluent from the treatment inlet port is directed by the valve heads to the drain port. With this arrangement, a by-pass valve may be converted to a backwash valve.

The valve can also be made to function as a combination by-pass and backwash valve by utilizing a bonnet threadably mounted in the casing and defining an additional valve seat. This seat is movable to cooperate with the adjacent one of the valve heads to convert the valve operation from a by-pass condition to a backwash condition. Thus, when the bonnet is in its inner position, the bonnet valve seat is engaged by the adjacent valve head and a normal by-pass condition is established such that the water from the supply port passes directly to the distribution port. When the bonnet is threaded outwardly to its outer or unseated position, water from the supply port passes around the valve head and through the treatment outlet port into the water treatment equipment. This is the backwash condition, and the effluent from the treatment inlet port passes to the drain port of the valve.

As previously indicated, when the present valve is used as a backwash valve, manual opening of the drain port allows backwash water from the treatment inlet port to pass out of the drain port until backwashing is completed, at which time the drain port is manually closed. It is another feature of the valve that it is also adapted to be easily converted to an automatic backwash operation. Instead of using a simple drain port closure, a special drain fitting or bonnet is used to define an additional valve seat adjacent to the treatment inlet port. This additional valve seat is engageable by the adjacent one of the valve heads in the service position of the valve stem to prevent water from passing out of the otherwise constantly open drain passage in the drain fitting. When the valve stem moves to its opposite or backwash position, the valve head disengages the drain bonnet valve seat and backwash water from the treatment inlet port flows out of the drain port until it is cut off by movement of the valve stem back to its service position.

Other objects and features of the invention will become apparent from consideration of the following description taken in connection with the accompanying drawings.

BRIEF DESCRIPTION OF THE DRAWINGS

FIG. 1 is a longitudinal cross sectional view of a valve according to the present invention;

FIG. 2 is a view taken along the line 2—2 of FIG. 1;

FIG. 3 is a view taken along the line 3—3 of FIG. 1;

FIGS. 4–6 are diagrammatic views of the valve illustrating the valve components in a service position, a by-pass position, and a backwash position, respectively; and FIG. 7 is a partial view of the drain port end of the valve, illustrating a modification adapted to adjust the rate of flow during a backwash operation.

DESCRIPTION OF THE PREFERRED EMBODIMENTS

Referring now to the drawings, there is illustrated a valve 10 for water treatment equipment generally designated by the numeral 12 in FIGS. 4–6.

The equipment 12 can be any of a great variety of devices for softening, conditioning, or filtering water.

The valve 10 can be used to by-pass water softener equipment so that the equipment can be repaired, or, in the case of non-automatic softeners, so that the softener tank can be replaced. The valve 10 can be quickly converted for use as a backwash valve, which is particularly useful in association with filter equipment, including small cartridge filters used in households for conditioning or deodorizing water, large filters in water treatment plants, commercial establishments and the like, and swimming pool filters.

The valve 10 illustrated in FIG. 1 is adapted to provide either a by-pass operation or a backwash operation, or both. As will be seen, where the operation is always a backwash or always a by-pass operation, the construction of the valve 10 can be greatly simplified to reduce its cost. The embodiment of FIG. 1 illustrates the form the valve 10 would take to function either as a by-pass valve or as a backwash valve, depending upon the selected position of certain of the components, as will be seen. An important feature of the invention, therefore, is the versatility of the valve in satisfying the needs of different applications.

The valve 10 comprises, generally, an elongated cylindrical valve body or casing 14 divided by internal means into a plurality of separate chambers, including a chamber 16 having a treatment inlet port 18, a chamber 20 having a supply port 22, and a chamber 24 having a distribution port 26 and a treatment outlet port 28.

The valve casing 14 is preferably made of cast brass or similar material, although it could also be made of molded plastic or any other suitable material capable of withstanding usual water main pressures. The treatment inlet port 18 and treatment outlet port 28 are illustrated as internally threaded bosses for coupling to conduits (not shown) extending to the water treatment equipment 12. The supply port 22 is adapted to be connected to the water supply, and the distribution port 26 is adapted to be connected, for example, to the plumbing network in a household. Of course, a household water softener system is merely exemplary, as will become apparent, and a wide variety of other applications for the valve 10 are contemplated.

The ports 18, 22, 26, and 28 are illustrated as internally threaded bosses, but it will be apparent that this configuration may be altered, if desired, to accommodate brazed or soldered connections.

The internal means which define the separate chambers 16, 20 and 24 take the form of a transverse partition or wall 30 defining a passage 32 between the chambers 16 and 20 and surrounded by a circumferential valve seat 34; a transverse partition or wall 36 defining a passage 38 between the chambers 20 and 24 surrounded by a valve seat 40; and a bonnet 42 sealing off the left end of the casing 14. A drain fitting or bonnet 44 similarly seals off the opposite or right end of the casing 14.

An elongated valve rod or stem 46 extends through the bonnet 44 and into the chamber 16. The outer or left end of the stem 46 is rotatably supported within an opening 48 provided in the bonnet 42, and a pair of O-rings 56 carried by the bonnet 42 engage the stem 46 and provide a sealing relation. Any suitable packing material can be substituted for the O-rings 50, if desired, so long as the stem is adapted to rotate. The outer end of the stem 46 carries a handle 52 which can be grasped to rotate the stem 46.

An internally threaded boss 54 forms an integral part of the casing 14, being supported in position by a pair of lateral webs 56, as best seen in FIG. 3. That portion of the stem 46 located in the vicinity of the boss 54 is externally threaded so that rotation of the stem 46 by the handle 52 is effective to threadably move the stem 46 in a longitudinal direction, according to the direction of rotation of the handle 52.

Location of the boss 54 in the chamber 20 adjacent to the right end of the stem 46 tends to insure that the stem 46 will not wobble, but will run straight and parallel to the longitudinal axis passing through the centers of the valve seats 34 and 40.

Valve heads 58 and 60 are secured to the valve stem 46 in positions adjacent the valve seats 34 and 40, respectively.

The valve head 58 comprises a cylindrical central element 62 having annular recesses on its opposite faces for receiving a pair of resilient flat annular washers or seals 64 and 66. The seal 64 engages a shoulder 68 integral with the stem 46, and a nut 70 threaded onto the threaded end of the stem 46 bears against the seal 66 to secure the valve head 58 in position. The resilient material of the seals 64 and 66 may be rubber or the like for good sealing engagement with the associated valve seats, as will be seen.

Valve head 60 is similar in construction to valve head 58, the annular recesses in the central element 72 similarly receiving a pair of flat annular washers or seals (not shown). One of the seals rests against a shoulder 74 integral with the stem 46, while the other seal is engaged by a nut 76 threaded upon an adjacent portion of the stem 46 which is threaded for that purpose.

The valve 10 thus far described can be operated as a by-pass valve. If the application for the valve 10 is such that it is expected to function solely as a by-pass valve, its structure can be simplified by eliminating the particular form of end bonnets 42 and 44 illustrated, and instead simply providing any suitable closures to seal off the ends of the chambers 24 and 16, as will be apparent. Such closures could terminate at the dash-dot lines 73 and 75, respectively.

Assuming the valve 10 is to be used solely for by-pass purposes in a typical application such as in association with a water softener connected to a household, the handle 52 is rotated to move the stem 46 longitudinally to the service position illustrated in FIGS. 1 and 4. In this position the washer face or seal 64 is unseated from the valve seat 34, and the corresponding face of the valve head 60 is seated upon the valve seat 40 to direct water from the supply port 22 to the treatment inlet port 18. This carries water into the water softener. Water from the treatment outlet port 28 is directed by the valve 10 to the distribution port 26 for use of the softened water by the householder.

By rotating the handle 52 in the opposite direction, the stem 46 is moved longitudinally to the left to a by-pass position in which the valve head 58 is seated upon the valve seat 34, and the valve head 60 is unseated from the valve seat 40. This directs water from the supply port 22 to the distribution port 26, bypassing the water treatment equipment or softener 12.

With a few minor modifications the single-purpose by-pass valve just described can be converted to a single-purpose backwash valve for use in association, for example, with water treatment equipment such as a filter. To do this the simple end closure at the right end of the valve is provided with a drain port 78. In addition, the end closure at the left end of the casing 14 is so located that it is out of engagement with the valve head 60 at all times. This provides a passage from the supply port 22 through the chambers 20 and 24, and past the valve head 60 to the treatment outlet port. The backwash effluent passes from the treatment inlet port 18 past the unseated valve head 58 and out of the drain port 78.

The valve 10 can also be easily modified to operate either as a by-pass valve or a backwash valve. This is accomplished by employing the bonnet 42 illustrated.

More particularly, the generally cylindrical bonnet 42 includes annular grooves which receive O-rings 80 and 82 to provide a sealing relation between the bonnet 42 and the interior of the casing 14. In the area between the O-rings 80 and 82 the cylindrical wall of the bonnet 42 is partially cut away or removed to provide four equally spaced integral webs 84, as seen in FIG. 2, with intervening water passages which provide communication between the treatment outlet port and the chamber 24. The left extremity of the bonnet 42 is threaded for cooperation with internal threads 84 provided at the left end of the casing 14. The left end of the bonnet 42 projects out of the casing 14 and terminates in an end cap or handle 86 which is rotatable to move the bonnet 42 axially along the longitudinal axis of the casing 14.

The innermost or right end of the bonnet 42 is open to define a passage 88 surrounded by a valve seat 90.

In describing the most simplified version of the valve 10, in which the simple end closure terminating at the line 73 was used instead of the bonnet 42, the chamber 24 was described as including both the supply port 26 and the treatment outlet port 28. However, in an embodiment in which the bonnet 42 is used, the end wall of the bonnet 42 containing the valve seat 90 defines an additional valve chamber 92 at the outer or left side of the valve seat 90. This chamber 92 includes the treatment outlet port 28 and the chamber 24 then includes the supply port 26.

In using the valve 10 just described in a by-pass operation, the valve heads 58 and 72 are spaced apart such that in their by-pass positions they are seated, respectively, upon the valve seats 34 and 90. This by-passes the water treatment equipment and routes water from the supply port 22 directly to the distribution port 26.

The valve 10 is easily converted to perform a backwash function, rather than the described by-pass function, and this can be accomplished in either of two ways, as desired. The thickness of the valve head 60 can be reduced so that it is out of engagement with the valve seat 90 in its leftmost position. This presents a passage for water from the supply port 22 around the valve head 60, and past the valve seat 90 to the treatment outlet port 92. The backwash from the treatment inlet port 18 passes around the valve head 58 and out of the drain port 78, which is manually opened during the backwash operation.

An alternative method of converting the valve to a backwash valve requires only that the bonnet handle 86 be rotated to move the valve seat 90 to the left, out of possible engagement with the valve head 60 in its leftmost position. This opens up a passage for a backwash flow of water in the manner previously described.

Thus far, in those modifications of the valve 10 which have been described as placing it in a backwash condition it has been assumed that the drain port 78 is manually opened when the backwashing operation is to be initiated. However, a special bonnet 44 can be utilized to make the backwash operation automatic. The bonnet 44 includes an always-open drain port 78, and the inner end of a cylindrical barrel portion 94 of the bonnet 44 defines a drain port passage surrounded by a valve seat 96 for engagement with seal 66 of the valve head 58.

With the valve heads 58 and 60 in the service positions illustrated, water flows through the water treatment equipment but cannot flow past the seated valve head 66 to the drain port 78. However, when the valve heads 58 and 60 are moved to their left-most positions, and the bonnet 42 threaded outwardly or to the left, a passage is provided between the valve head 72 and the valve seat 90 so that backwash water from the supply port 22 can pass to the treatment outlet port 28. Water from the treatment inlet port 18 flows past the unseated valve head 58 and out of the drain port 78.

There are instances in which it is desirable to backwash the water treatment equipment 12 with water flowing at a slower rate than would normally flow through the system. For example, where the water treatment equipment is a filter using a very light filter media, the water flow should be reduced to prevent the filter media from being carried away. The embodiment of FIG. 7 is intended to meet this need.

Like numerals with letter subscripts are used to denote parts analagous to the parts of the valve embodiments already described.

A valve bonnet 44a including a central drain port 78 is threaded into the right end of the valve casing 14. The bonnet 44a includes a cylindrical barrel portion 94a including annular, longitudinally spaced apart fins which receive and support a sealing O-ring 98 engaged upon the adjacent surface of the casing 14. The barrel portion 94 terminates in a circular end face 100 to which is secured a resilient flat circular seal 102 for engagement with a partition or wall integral with the casing 14 and defining a passage 104 surrounded by a valve seat 106.

The periphery of the face 100 has a diameter less than the interior diameter of the adjacent casing 14 so that a water passage is provided around the face 100. Openings 108 are cut into the barrel portion 94 to provide communication between the exterior and interior of the barrel portion 94.

With the foregoing arrangement, by simply threadably moving the bonnet 44a outwardly or to the right, the seal 102 is unseated from the valve seat 106 and backwash water flows from the treatment inlet port 18 out of the drain port 78. The rate of flow of such backwash water is controlled by the degree to which the bonnet 44a is threaded out, as will be apparent.

In each of the embodiments described, the location of the threaded boss 54 in the chamber 20 provides firm support for the valve stem 46 without obstructing access to the valve components from the opposite ends of the casing 14.

Disassembly of the valve 10 of FIG. 1 is easily achieved by threaded removal of the bonnets 42 and 44, followed by removal of the nut 70 and valve head 58. The remainder of the valve stem 46 and the valve head 60 can then be removed from the opposite end of the casing 14.

The orientation of the valve seats 106, 34, and 40 is such that they face outwardly such that they can be easily machined by tooling extending into the open ends of the casing 14.

The foregoing valve is thus uniquely adapted to perform a variety of functions in association with different kinds of water treatment equipment. With relatively slight alterations, the valve is adapted to perform either a bypass or a backwash operation, or both, if desired. Moreover, the construction of the valve is sufficiently straightforward that its manufacture and maintenance are relatively inexpensive, and the nature of the interengagement between the valve heads and the valve seats is such that the seals have a long, leak-free service life, as compared with O-ring seals and the like.

Various modifications and changes may be made with regard to the foregoing detailed description without departing from the spirit of the invention.

I claim:

1. A valve for water treatment equipment, said valve comprising:
    a casing including means defining a first chamber having a treatment inlet port, a second chamber having a supply port, a third chamber having a distribution port, and a fourth chamber having a treatment outlet port, said means further defining a passage between said first and second chambers surrounded by a first valve seat, said means further defining a passage between said second and third chambers surrounded by a second valve seat, said means further defining a passage between said third and fourth chambers surrounded by a third valve seat in confronting relation to said second valve seat;
    a valve stem threadably supported by said casing and rotatable to move said valve stem longitudinally; and
    first and second valve heads mounted to and movable with said valve stem toward a service position in which a face of said first valve head is unseated from said first valve seat, and opposite faces of said second valve head are seated upon said second valve seat and unseated from said third valve seat, respectively, to direct water from said supply port to said treatment inlet port and from said treatment outlet port to said distribution port, said first and second valve heads being movable with said valve stem toward a by-pass position in which said face of said first valve head is seated upon said first valve seat, and said opposite faces of said second valve head are unseated from said second valve seat and seated upon said third valve seat, respectively, to direct water from said supply port through said second chamber between said first and second valve heads to said distribution port, said casing including a threaded boss located in said second chamber, and providing the threaded support for said valve stem, whereby said first and second valve heads are accessible from opposite ends of said casing.

2. A valve for water treatment equipment, said valve comprising:
    a casing including means defining a first chamber having a treatment inlet port, a second chamber having a supply port, a third chamber having a distribution port, and a fourth chamber having a treatment outlet port, said means further defining a passage between said first and second chambers surrounded by a first valve seat, said means further defining a passage between said second and third chambers surrounded by a second valve seat, said means further defining a passage between said third and fourth chambers surrounded by a third valve seat in confronting relation to said second valve seat;
    a valve stem threadably supported by said casing and rotatable to move said valve stem longitudinally; and
    first and second valve heads mounted to and movable with said valve stem toward a service position in which a face of said first valve head is unseated from said first valve seat, and opposite faces of said second valve head are seated upon said second valve seat and unseated from said third valve seat, respectively, to direct water from said supply port to said treatment inlet port and from said treatment outlet portion to said distribution port, said first and second valve heads being movable with said valve stem toward a by-pass position in which said face of said first valve head is seated upon said first valve seat, and said opposite faces of said second valve head are unseated from said second valve seat and seated upon said third valve seat, respectively, to direct water from said supply port through said second chamber between said first and second valve heads to said distribution port, said means defining said third valve seat comprising a bonnet rotatably supporting one extremity of said valve stem and threadedly supported by said casing for threaded longitudinal movement independently of said valve stem thereby to move said third valve seat out of seating relation with said second valve head in said by-pass position whereby water can pass from said supply port, through said second, third and fourth chambers to said treatment outlet port for backwashing water treatment equipment.

3. A valve for water treatment equipment, said valve comprising:
    a casing including means defining a first chamber having a treatment inlet port, a second chamber having a supply port, a third chamber having a distribution port, and a fourth chamber having a treatment outlet port, said means further defining a passage between said first and second chambers surrounded by a first valve seat, said means further defining a passage between said second and third chambers surrounded by a second valve seat, said means further defining a passage between said third and fourth chambers surrounded by a third valve seat in confronting relation to said second valve seat;

a valve stem threadably supported by said casing and rotatable to move said valve stem longitudinally; and first and second valve heads mounted to and movable with said valve stem toward a service position in which a face of said first valve head is unseated from said first valve seat, and opposite faces of said second valve head are seated upon said second valve seat and unseated from said third valve seat, respectively, to direct water from said supply port to said treatment inlet port and from said treatment outlet port to said distribution port, said first and second valve heads being movable with said valve stem toward a by-pass position in which said face of said first valve head is seated upon said first valve seat, and said opposite faces of said second valve head are unseated from said second valve seat and seated upon said third valve seat, respectively, to direct water from said supply port through said second chamber between said first and second valve heads to said distribution port, the longitudinal distance between said first valve seat and said third valve seat being less than the longitudinal distance between the faces of said first and second valve heads which confront said first and third valve seats, respectively, whereby water can pass from said third chamber into said fourth chamber for backwashing water treatment equipment when said first valve head is seated upon said first valve seat.

4. A valve for water treatment equipment, said valve comprising:

a casing including means defining a first chamber having a treatment inlet port and a drain port, a second chamber having a supply port, a third chamber having a distribution port, and a fourth chamber having a treatment outlet port, said means further defining a passage between said first and second chambers surrounded by a first valve seat, said means further defining a passage between said second and third chambers surrounded by a second valve seat, said means further defining a passage between said drain port and said first chamber surrounded by a fourth valve seat in confronting relation to said first valve seat;

a bonnet rotatably supporting one extremity of said valve stem, and threadably supported by said casing for threaded longitudinal movement, independently of said valve stem, between a by-pass position and a back-wash position, said bonnet defining a passage between said third and fourth chambers surrounded by a third valve seat in confronting relation to said second valve seat;

a valve stem threadably supported by said casing and rotatable to move said valve stem longitudinally; and first and second valve heads mounted to and movable with said valve stem toward a service position in which opposite faces of said first valve head are unseated from said first valve seat and seated upon said fourth valve seat, respectively, and opposite faces of said second valve head are seated upon said second valve seat and unseated from said third valve seat, respectively, to direct water from said supply port to said treatment inlet port and from said treatment outlet port to said distribution port, said first and second valve heads being movable with said valve stem toward a by-pass position in which said opposite faces of said first valve head are seated upon said first valve seat and unseated from said fourth valve seat, respectively, and said opposite faces of said second valve head are unseated from said second valve seat and seated upon said third valve seat, respectively, to direct water from said supply port to said distribution port, said bonnet being longitudinally movable to move said third valve seat out of seating relation with said second valve head in said by-pass position of said valve stem whereby a back-wash condition is established wherein water is directed from said supply port to said treatment outlet port, and from said treatment inlet port to said drain port.

5. A valve for water treatment equipment, said valve comprising:

a casing including means defining an elongated chamber having a supply port, a distribution port, a treatment inlet port, a treatment outlet port, a first valve seat defining a passage between said supply port and said treatment inlet port, a second valve seat defining a passage between said supply port and said distribution port, and also between said supply port and said treatment outlet port, and a third valve seat in confronting relation to said second valve seat and defining a passage between said treatment outlet port and said distribution port;

a valve stem supported by said casing and operative to move said valve stem longitudinally; and first and second valve heads mounted to and movable with said valve stem toward a service position in which said first valve head is unseated from said first valve seat, and said second valve head is seated upon said second valve seat and unseated from said third valve seat, to direct water from said supply port to said treatment inlet port and from said treatment outlet port to said distribution port, said first and second valve heads being movable with said valve stem toward a by-pass position in which said first valve head is seated upon said first valve seat, and said second valve head is unseated from said second valve seat and seated upon said third valve seat, to direct water from said supply port through said elongated chamber between said first and second valve heads to said distribution port;

the portion of said means defining said third valve seat comprising a bonnet supporting one extremity of said valve stem and supported by said casing for longitudinal movement independently of said valve stem thereby to move said third valve seat out of seating relation with said second valve head in said by-pass position whereby water can pass from said supply port, through said second, third and fourth chambers to said treatment outlet port for back-washing water treatment equipment.

* * * * *